United States Patent
Kailasam et al.

(10) Patent No.: US 11,100,289 B1
(45) Date of Patent: Aug. 24, 2021

(54) SYSTEMS AND METHODS FOR ENHANCING NATURAL LANGUAGE PROCESSING

(71) Applicant: CERNER INNOVATION, INC., Kansas City, KS (US)

(72) Inventors: Kanakasabha Kailasam, Olathe, KS (US); Douglas S. McNair, Leawood, KS (US); John Christopher Murrish, Overland Park, KS (US); David Cohen, Leawood, KS (US); Josh Smith, Kansas City, MO (US); Alex Vickers, Gladstone, MO (US); Tanuj Gupta, Leawood, KS (US)

(73) Assignee: CERNER INNOVATION, INC., Kansas City, KS (US)

( * ) Notice: Subject to any disclaimer, the term of this patent is extended or adjusted under 35 U.S.C. 154(b) by 200 days.

(21) Appl. No.: 16/284,844

(22) Filed: Feb. 25, 2019

Related U.S. Application Data

(60) Provisional application No. 62/634,571, filed on Feb. 23, 2018.

(51) Int. Cl.
*G06F 40/30* (2020.01)
*G06F 40/205* (2020.01)

(52) U.S. Cl.
CPC ............ *G06F 40/30* (2020.01); *G06F 40/205* (2020.01)

(58) Field of Classification Search
CPC .............................. G06F 40/30; G06F 40/205
See application file for complete search history.

(56) References Cited

U.S. PATENT DOCUMENTS

| | | | |
|---|---|---|---|
| 10,733,566 B1 * | 8/2020 | Chan | G06N 20/00 |
| 2014/0012790 A1 * | 1/2014 | Oberkampf | G16H 50/20 |
| | | | 706/46 |
| 2017/0124269 A1 | 5/2017 | Mcnair et al. | |
| 2019/0189253 A1 * | 6/2019 | Kartoun | G16H 50/30 |

* cited by examiner

*Primary Examiner* — Sonia L Gay
(74) *Attorney, Agent, or Firm* — Shook, Hardy & Bacon L.L.P.

(57) ABSTRACT

Methods and systems for enhanced natural language processing of clinical documentation are provided. Using natural language processing, a clinical condition is extracted from unstructured data within a current electronic document. A clinical ontology identifying itemsets associated with the clinical condition is retrieved, and indicators of relevant clinical concepts, as identified from the ontology, are searched from within the patient's longitudinal record, which comprises documentation from at least a prior encounter. Based on the whether the clinical concepts are present in the patent's record, a confidence is assigned to the NLP-extracted clinical condition, and one or more actions may be performed.

14 Claims, 8 Drawing Sheets

HISTORY OF PRESENT ILLNESS
DATE OF ADMISSION:12/29/2014
--

SOCIAL HISTORY
--

FAMILY HISTORY
--

REVIEW OF SYSTEMS
--

PHYSICAL EXAMINATION
--

IMPRESSION/PLAN
    1. NOT SURE IF THE PATIENT IS DEHYDRATED. QUESTION IF HYPONATREMIA IS WORSENING AND IF SO WILL CONTINUE CURRENT MEDICATIONS.

SYSTEMS AND METHODS FOR ENHANCING NATURAL LANGUAGE PROCESSING

CROSS-REFERENCE TO RELATED APPLICATIONS

This application claims the benefit of U.S. Provisional Application No. 62/634,571 titled "SYSTEMS AND METHODS FOR ENHANCING NATURAL LANGUAGE PROCESSING," filed on Feb. 23, 2018, which is hereby expressly incorporated by reference in its entirety.

BACKGROUND

Studies have shown that a significant amount of data resides in unstructured form in clinical documents, including clinician narratives. Existing systems utilize natural language processing techniques to extract and understand content from documents, including unstructured data. While it is important to include content from documents for completeness, it is more important that extraction of content using natural language processing techniques does not compromise the quality of data as the nature of the technology brings uncertainties with it. Conventional medical language processing and clinical documentation technologies are susceptible to ambiguities and error because they inadequately connect or fail to integrate a clinician's narrative text, such as a physician's comments, with a patient's health record. This failure results in disparity and missing information that may lead to misdiagnoses, unnecessary testing or orders, or improper utilization of healthcare resources. For instance, conventional approaches to parsing and understanding information from such narrative content without context has the potential to misrepresent a patient's information. Additionally, the current technologies fail to capture, recognize, or incorporate into structured, usable data valuable longitudinal patient information that may be related to the clinician's narrative, which may include information residing in other parts of the patient's electronic record and from prior encounters. This additional information that is lost or ignored by conventional technologies also may provide a more complete understanding of the clinician's narrative in view of the patient's record. In a health care environment, these limitations and errors can be catastrophic.

SUMMARY

Systems, methods and computer-readable media are provided for enhancing natural language processing techniques for a clinical document by identifying corroborating evidence of a clinical condition extracted from unstructured data using natural language processing. For example, in an embodiment, a clinical document is processed using natural language processing ("NLP"), which includes identifying and extracting clinical concepts, such as a clinical condition from unstructured data. After a clinical concept, such as a clinical condition is extracted, one or more clinical ontologies are determined. These ontologies may be used to identify high-value itemsets representing physiological and patient variables related to the clinical condition. The high-value itemsets then may be utilized to determine specific patient information or a type of patient information to search for in a patient's medical record, which may be used to verify the clinical condition in the narrative, supplement it with additional, relevant information, or serve as a basis for recommendations or orders. In this way, the processed clinical document and the patient's longitudinal electronic health record with documentation from previous encounters are utilized to identify and incorporate information about the clinical concepts, as identified by the ontology.

In some embodiments, a statistical confidence may be assigned to the extracted clinical condition in the processed document based on whether the clinical condition could be supported with structured data in the patient's longitudinal record. Based on the confidence assigned, an entry in a specialized relational database or data record may be created indicating the confidence value and the corroborating evidence or lack thereof, and the entry may be linked to the processed document. In some embodiments, a portion of the clinical document, such as the extracted clinical condition, may be tagged or marked up, or an indication about the statistical confidence and/or relevant supplemental information linked to the document may be provided within or associated with the document. In some instances, a notification may be provided in real time to the clinician who is creating the narrative, with the notification requesting additional information to be included in the narrative, such as when the confidence value is uncertain or negative. A document quality process may also be initiated to review whether a coding level in the current document is supported by sufficient documentation. One aim of the disclosure is to provide improved natural language processing technology with reduced errors and increased confidence and to provide mechanisms for identifying potential problems where there is a lack of corroborating evidence and prompting the supply of additional supporting information.

BRIEF DESCRIPTION OF THE DRAWINGS

The present invention is described in detail below with reference to the attached drawing figures, wherein:

FIGS. 4A-4D depict portions of the illustrative operating environment as provided through graphic user interfaces in accordance with embodiments of the present disclosure.

DETAILED DESCRIPTION

Figure 1A:
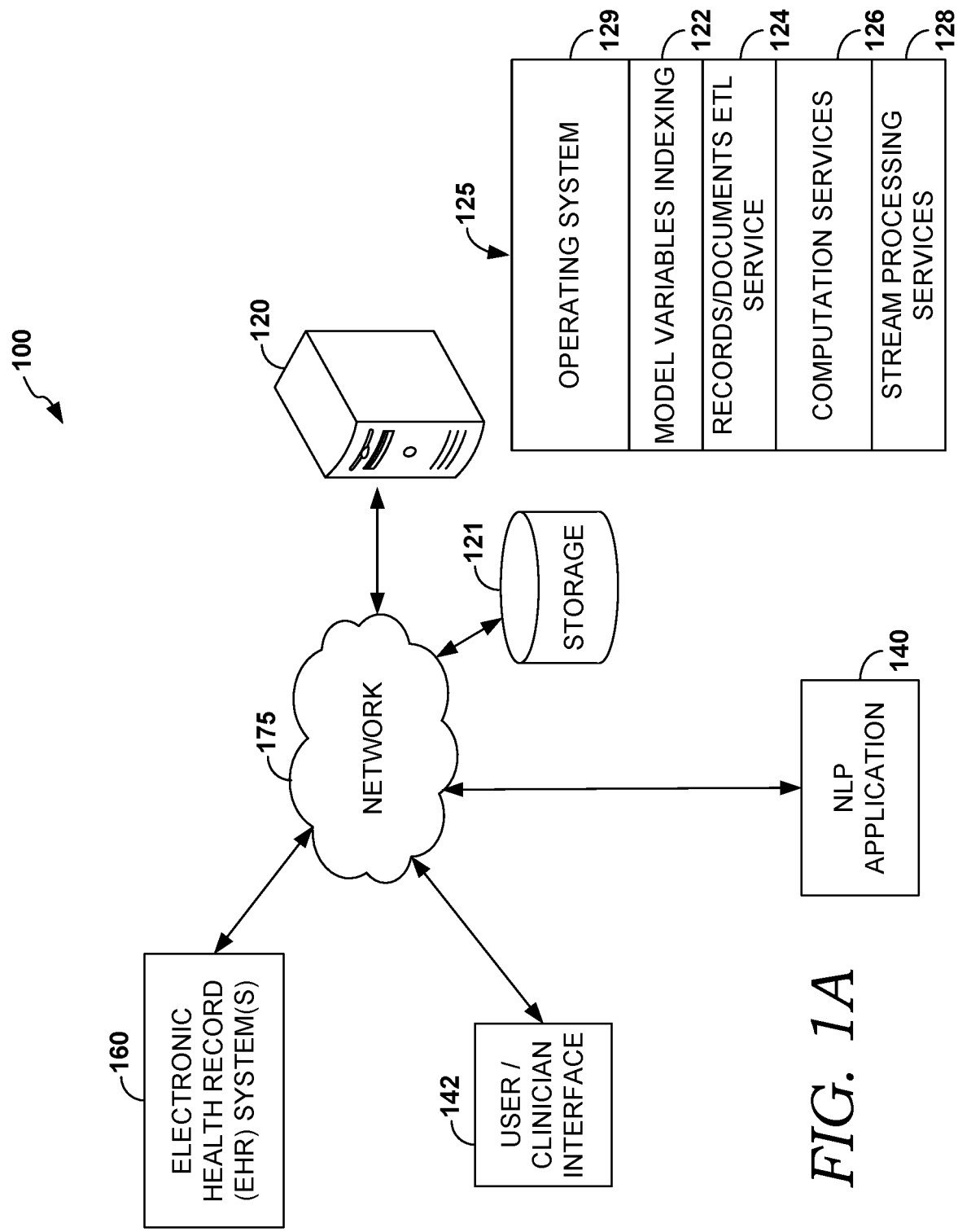
FIGS. 1A and 1B depict aspects of an illustrative operating environment suitable for practicing an embodiment of the disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media, as discussed further with respect to FIGS. 1A-1B.

Accordingly, at a high level, this disclosure describes, among other things, methods and systems for enhancing natural language processing (NLP) techniques for clinical documents. In some embodiments, the methods and systems may be implemented as a decision support computer application or tool and may be part of a more comprehensive healthcare decision support application for monitoring patients and providing decision support to caregivers. Such decision support technology plays an important part of modern care processes for a patient. Embodiments described herein verify a diagnosis of a clinical condition as identified through NLP by searching for corroborating evidence of the diagnosis in the patient's longitudinal electronic health record. Based on the statistical confidence assigned, an entry in a specialized relational database or data record may be created indicating the confidence value and the corroborating evidence or lack thereof, and the entry may be linked to the processed document. In some embodiments, a portion of the clinical document, such as the extracted clinical condition, may be tagged or marked up, or an indication may be provided within or associated with the document about the statistical confidence or relevant supplemental information linked to the document. In some instances, a notification may be provided in real time to the clinician creating the narrative, with the notification requesting that additional information be included in the narrative, such as when the confidence value is uncertain or negative. A document quality process may also be initiated to review whether a coding level in the current document is supported by sufficient documentation.

Accordingly, one aim of embodiments of this disclosure relates to improving NLP systems for clinical documentation to provide natural language processing with increased confidence levels. Studies have shown that a significant amount of data resides in unstructured form in clinical documents, including clinician narratives. Existing systems utilize NLP techniques to extract and understand content from documents, including unstructured data. Particularly with clinical documentation, it is important that extraction of content using such NLP techniques does not compromise the quality of data, as the nature of the technology brings uncertainties with it. Conventional medical language processing and clinical documentation technologies are susceptible to ambiguities and error because they inadequately connect or fail to integrate a clinician's narrative text, such as a physician's comments, with a patient's health record. Such a failure results in disparity and missing information that may lead to misdiagnoses, unnecessary testing or orders, or improper utilization of healthcare resources, for example. For instance, conventional approaches to parsing and understanding information from such narrative content without context has the potential to misrepresent a patient's information. Additionally, the current technologies fail to capture, recognize, or incorporate into structured, usable data valuable longitudinal patient information that may be related to the clinician's narrative, which may include information residing in other parts of the patient's electronic record and from prior encounters or that is only accessible to a user through separate applications. In a health care environment, these limitations and errors can be catastrophic.

Accordingly, embodiments of the disclosure as described herein improve upon conventional industry practice by utilizing information from the patient's electronic health record, as determined relevant by a clinical ontology, to assign a confidence to the result of the NLP, providing greater confidence in the assigned confidence and reducing errors. Embodiments perform NLP on unstructured data within a current electronic document, such as a clinician's note, to parse and extract discrete clinical elements, including a clinical condition associated with the patient. A clinical ontology associated with the clinical condition is retrieved, and one or more related clinical concepts, such as clinical findings, observations, medications, and procedures, are identified from the ontology. The current document and a patient's longitudinal electronic health record containing documentation from previous encounters are searched to find the presence of related clinical concepts. Based on the results of the search, a confidence value (such as positive, negative, or uncertain) may be assigned to the clinical condition extracted from the current document.

Based on the confidence assigned, a number of actions may be triggered. For example, when the current document is still open in an application, a notification may be generated and sent to a user of the application indicating the assigned confidence. For example, the notification may confirm the diagnosis of the clinical condition when there is a positive confidence, or a notification requesting that additional supporting documents be appended to the patient record may be provided when there is a negative or uncertain confidence. Additionally, after the confidence value is assigned, a metadata tag associated with the current document may be created for storing the assigned confidence. Further, when the confidence value is uncertain or negative, an entry in a specialized relational database, such as a problem list, may be created linking the confidence value to the current document, and the entry may be provided to a user meeting predefined qualifications for manual review. In other embodiments, the assigned confidence value may also trigger a coding document quality process to check whether the documentation supports a given coding level assigned to the clinical condition.

Embodiments of the present disclosure improve upon current NLP technology by utilizing the clinical ontology and information stored in a patient's electronic health record from previous encounters. The clinical ontology helps identify information previously found to have a high relevance to the existence of or severity of a particular clinical condition, and the patient's longitudinal record provides a potential source for finding that relevant information that might not otherwise be available in the current processed document. Finding the relevant information within the patient's longitudinal record corroborates the clinical condition extracted from unstructured data, such as a clinician's note, thereby increasing the sensitivity and specificity of the natural language process that could not otherwise be achieved through traditional solutions, which focus only on current document or do not identify information of high contextual relevance. Additionally, using the longitudinal information allows for creating a time series of values of the related concepts to provide time-orientated semantics, which further increases specificity and sensitivity as the pattern or trajectory of values within a clinical context may be particularly relevant to a clinical condition diagnosis. In this way, the clinical ontology and a patient's longitudinal electronic health record are new sources of information that, when integrated into NLP systems as described in the present disclosure, improve upon existing NLP technologies by increasing the confidence level of an assigned confidence to the extracted information.

Referring now to the drawings in general and, more specifically, referring to FIG. 1A, an aspect of an operating environment 100 is provided suitable for practicing an embodiment of this disclosure. Certain items in block-diagram form are shown more for being able to reference something consistent with the nature of a patent than to imply that a certain component is or is not part of a certain device. Similarly, although some items are depicted in the singular form, plural items are contemplated as well (e.g., what is shown as one data store might really be multiple data-stores distributed across multiple locations). But showing every variation of each item might obscure aspects of the invention. Thus, for readability, items are shown and referenced in the singular (while fully contemplating, where applicable, the plural). Further, as with operating environment 100, many of the elements described herein are functional entities that may be implemented as discrete or distributed components or in conjunction with other components and may be implemented in any suitable combination and location. As described above, some embodiments may be implemented as a system, comprising one or more computers and associated network and equipment, upon which a method or computer software application is executed. Accordingly, aspects of the present disclosure may take the form of an embodiment combining software and hardware aspects that may all generally be referred to herein as a "module" or "system." Further, the methods of the present disclosure may take the form of a computer application embodied in computer readable media having machine-readable application software embodied thereon. In this regard, a machine-readable storage media may be any tangible medium that can contain or store a software application for use by the computing apparatus.

As shown in FIG. 1A, example operating environment 100 provides an aspect of a computerized system for compiling and/or running an embodiment for providing enhanced natural language processing of clinical documentation. Computer application software for carrying out operations for system components or steps of the methods of the present disclosure may be authored in any combination of one or more programming languages, including an object-oriented programming language such as Java, Python, R, or C++ or the like. Alternatively, the application software may be authored in any or a combination of traditional non-object-oriented languages, such as C or Fortran. The application may execute entirely on the user's computer as an independent software package, or partly on the user's computer in concert with other connected co-located computers or servers, or partly on the user's computer and partly on one or more remote computers, or entirely on a remote computer or collection of computers. In the latter cases, the remote computers may be connected to the user's computer through any type of network, including a local area network (LAN) or a wide area network (WAN), or the connection may be made to an external computer (for example, via the internet using an Internet Service Provider or ISP) or an arbitrary, geographically-distributed, federated system of computers, such as a cloud-based system.

Moreover, the components of operating environment 100, the functions performed by these components, or the services carried out by these components may be implemented at appropriate abstraction layer(s), such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example operating environment 100, it is contemplated that, in some embodiments, functionality of these components can be shared or distributed across other components.

Environment 100 includes one or more electronic health record (EHR) systems, such as EHR system(s) 160 communicatively coupled to network 175, which is communicatively coupled to computer system 120. In some embodiments, components of environment 100 that are shown as distinct components may be embodied as part of or within other components of environment 100. For example, EHR system(s) 160 may comprise one or a plurality of EHR systems such as hospital EHR systems, health information exchange EHR systems, clinical genetics/genomics systems, ambulatory clinic EHR systems, psychiatry/neurology EHR systems, insurance, collections or claims records systems, and may be implemented in computer system 120. Similarly, EHR system 160 may perform functions for two or more of the EHR systems (not shown). In an embodiment, EHR system 160 includes historical claims data for health services, apportionment data, and related health services financial data.

In some embodiments of the technologies described herein, sequence itemset mining is performed using data about a population of patients derived from patient EHR or other records information. In particular, presently certain data warehouses are created for purposes of public health and observational research purposes and are derived from electronic health records repositories in such a way that they are de-identified so as to comply with applicable confidentiality laws and regulations. The Cerner Health Facts' data warehouse is such a system, and it comprises a large 'transaction database' in which each entry corresponds to a patient's 'basket' (a collection of items recorded or transacted at points in time during episodes of care services provisioning in the contributing health care institutions). Each database entry is ordered by the date-time of the transaction. Transaction sequencing is implemented by grouping clinical events occurring in the same 'epoch' for the same patient together into 'baskets' and ordering the 'baskets' of each patient by the date-time stamps where the events occurred. Epoch durations may differ according to the age of the patient, the acute or chronic nature of the health conditions that pertain to the patient, the rate of change of the severity of the health conditions, or other factors. Epoch durations may be as short as a few minutes (as in critical care ICU or operating room contexts) or may be as long as 10 years or more (as in chronic ambulatory care-sensitive conditions, ACSCs).

Continuing with FIG. 1A, network 175 may comprise the Internet, and/or one or more public networks, private networks, other communications networks, such as a cellular network or similar network(s) for facilitating communication among devices connected through the network. In some embodiments, network 175 may be determined based on factors such as the source and destination of the information communicated over network 175, the path between the source and destination, or the nature of the information. For example, intra-organization or internal communication may use a private network or virtual private network (VPN). Moreover, in some embodiments, items shown communicatively coupled to network 175 may be directly communicatively coupled to other items shown communicatively coupled to network 175.

In some embodiments, operating environment 100 may include a firewall (not shown) between a first component and network 175. In such embodiments, the firewall may reside on a second component located between the first component and network 175, such as on a server (not shown), or reside on another component within network 175, or may reside on or as part of the first component.

Embodiments of EHR system 160 include one or more data stores of health-related records, which may be stored on storage 121, and may further include one or more computers or servers that facilitate the storing and retrieval of the health records. In some embodiments, EHR system 160 and/or other records systems may be implemented as a cloud-based platform or may be distributed across multiple physical locations. EHR system 160 may further include record systems that store real-time or near real-time patient (or user) information, such as wearable sensor or monitor, bedside, or in-home patient monitors or sensors, for example. Although FIG. 1A depicts an example EHR system 160, it is contemplated that an embodiment relies on natural language process (NLP) application 140 for storing and retrieving patient record information.

Example operating environment 100 further includes a user/clinician interface 142 and NLP application 140, each communicatively coupled through network 175 to an EHR system 160. Although environment 100 depicts an indirect communicative coupling between interface 142 and application 140 with EHR system 160 through network 175, it is contemplated that an embodiment of interface 142 or application 140 may be communicatively coupled to EHR system 160 directly. An embodiment of NLP application 140 comprises a software application or set of applications (which may include programs, routines, functions, or computer-performed services) residing on a client computing device, such as a personal computer, laptop, smartphone, tablet, or mobile computing device or application 140 may reside on a remote server communicate coupled to a client computing device. In an embodiment, application 140 is a Web-based application or applet and may be used to provide or manage user services provided by an embodiment of the technologies described herein, which may be used to provide, for example, semantic analysis on documents created by or used by a caregiver. In some embodiments, application 140 includes or is incorporated into a computerized decision support tool. Further, some embodiments of application 140 utilize user/clinician interface 142.

In some embodiments, application 140 and/or interface 142 facilitate accessing and receiving information from a user or healthcare provider about a specific patient or set of patients, according to the embodiments presented herein. Embodiments of application 140 also may facilitate accessing and receiving information from a user or healthcare provider about a specific patient, caregiver, or population including historical data; healthcare resource data; variables measurements; time series information; reference information, including clinical ontologies; and relational databases, as described herein; or other health-related information, and facilitates the display of results of the enhanced language process as described herein. NLP application 140 may also be used for as a resource for machine learning statistical relationship amongst clinical concepts and may be used for document quality control applications, such as one for reviewing and confirming the supporting documentation for a coding level.

In some embodiments, user/clinician interface 142 may be used with application 140, such as described above. One embodiment of user/clinician interface 142 comprises a user interface that may be used to facilitate access by a user (including a healthcare provider or patient) to an assigned clinician, patient, or patient population. One embodiment of interface 142 takes the form of a graphical user interface and application, which may be embodied as a software application (e.g., NLP application 140) operating on one or more mobile computing devices, tablets, smartphones, front-end terminals in communication with back-end computing systems, laptops, or other computing devices. In an embodiment, the application includes the PowerChart® software manufactured by Cerner Corporation. In an embodiment, interface 142 includes a Web-based application, which may take the form of an applet or app, or a set of applications usable to manage user services provided by an embodiment of the technologies described herein.

In some embodiments, interface 142 may facilitate providing the output of the enhanced natural language processing; providing instructions or outputs of other actions described herein; and logging and/or receiving other feedback from the user/caregiver, in some embodiments. Interface 142 also may be used for providing diagnostic services or evaluation of the performance of various embodiments Example operating environment 100 further includes computer system 120, which may take the form of one or more servers and which is communicatively coupled through network 175 to EHR system 160, and storage 121. Computer system 120 comprises one or more processors operable to receive instructions and process them accordingly and may be embodied as a single computing device or multiple computing devices communicatively coupled to each other. In one embodiment, processing actions performed by computer system 120 are distributed among multiple locations, such as one or more local clients and one or more remote servers, and may be distributed across the other components of example operating environment 100. For example, aspects of NLP application 140 or user/clinician interface 142 may operate on or utilize computer system 120. Similarly, a portion of computing system 120 may be embodied on user/clinician interface 142, application 140, and/or EHR system 160. In one embodiment, computer system 120 comprises one or more computing devices, such as a server, desktop computer, laptop, or tablet, cloud-computing device or distributed computing architecture, a portable computing device such as a laptop, tablet, ultra-mobile P.C., or a mobile phone.

Embodiments of computer system 120 include computer software stack 125, which, in some embodiments, operates in the cloud, as a distributed system on a virtualization layer within computer system 120, and includes operating system 129. Operating system 129 may be implemented as a platform in the cloud and is capable of hosting a number of services such as 122, 124, 126, and 128. Some embodiments of operating system 129 comprise a distributed adaptive agent operating system. Embodiments of services 122, 124, 126, and 128 may run as local services or may be distributed across one or more components of operating environment 100, in the cloud, on one or more personal computers or servers such as computer system 120, and/or a computing device running interface 142 or application 140. In some embodiments, interface 142 and/or application 140 operate in conjunction with software stack 125.

In embodiments, model variables indexing service 122 and records/documents ETL service 124 provide services that facilitate retrieving actions performed for a patient that are electronically recorded in the patient's EHR. Services 122 and/or 124 may also provide services for retrieving and extracting patient physiological variables, action indicators, which may include frequent itemsets and/or high-value itemsets, extracting database records, and cleaning the values of variables in records. For example, services 122 and/or 124 may perform functions for synonymic discovery, indexing or mapping variables in records, or mapping disparate health systems' ontologies. In some embodiments, these services may invoke computation services 126.

Computation services 126 may perform statistical or computing operations such as computing functions or routines for determining confidence levels of extracted information, as further described herein. Computation services 126 also may include natural language processing services (not shown) such as Discern nCode™ developed by Cerner Corporation, or similar services. In an embodiment, computation services 126 include the services or routines that may be embodied as one or more software agents or computer software routines. Computation services 126 also may include services or routines for utilizing one or more models, including logistic models. Additionally, some embodiments of stack 125 further comprise one or more services stream processing service(s) 128. For example, such stream processing service(s) 128 may be embodied using IBM InfoSphere stream processing platform, Twitter Storm stream processing, Ptolemy or Kepler stream processing software, or similar complex event processing (CEP) platforms, frameworks, or services, which may include the use of multiple such stream processing services in parallel, serially, or operating independently. Some embodiments of the invention also may be used in conjunction with Cerner Millennium®, Cerner CareAware® (including CareAware iBus®), Cerner CareCompass®, or similar products and services.

In some embodiments, stack 125 comprises model data and model storage services (not shown), and computation services 126 use EHR system(s) 160, model data and model storage services, and/or other components of example operating environment 100, and may also include services to facilitate receiving and/or pre-processing data. Model data and model storage services may be utilized to perform services for facilitating storage, retrieval, and implementation of the models used in connection with embodiments of the disclosure and of the data used in the models. Some embodiments of stack 125 may further comprise services for utilizing an Apache Hadoop and Hbase framework (not shown), or similar frameworks operable for providing a distributed file system, and which in some embodiments facilitate provide access to cloud-based services such as those provided by Cerner Healthe Intent®.

Example operating environment 100 also includes storage 121 (or data store 121), which in some embodiments includes patient data for a patient (or information for multiple patients), including raw and processed patient data; variables associated with patient diagnoses; and information pertaining to clinicians and staff, include user preferences. Data store 121 may further include recommendation knowledge base; recommendation rules; recommendations; recommendation update statistics; an operational data store, which stores events, frequent itemsets (such as "X often happens with Y", for example), and high-value itemsets (as described in more detail herein); itemset index information; association rulebases; agent libraries, solvers and solver libraries, and other similar information, including data and computer-usable instructions; patient-derived data; and healthcare provider information, for example. It is contemplated that the term "data" includes any information that can be stored in a computer-storage device or system, such as user-derived data, computer usable instructions, software applications, or other information. In some embodiments, data store 121 comprises the data store(s) associated with EHR system 160. Further, although depicted as a single storage data store, data store 121 may comprise one or more data stores, or may be in the cloud.

Figure 1B:
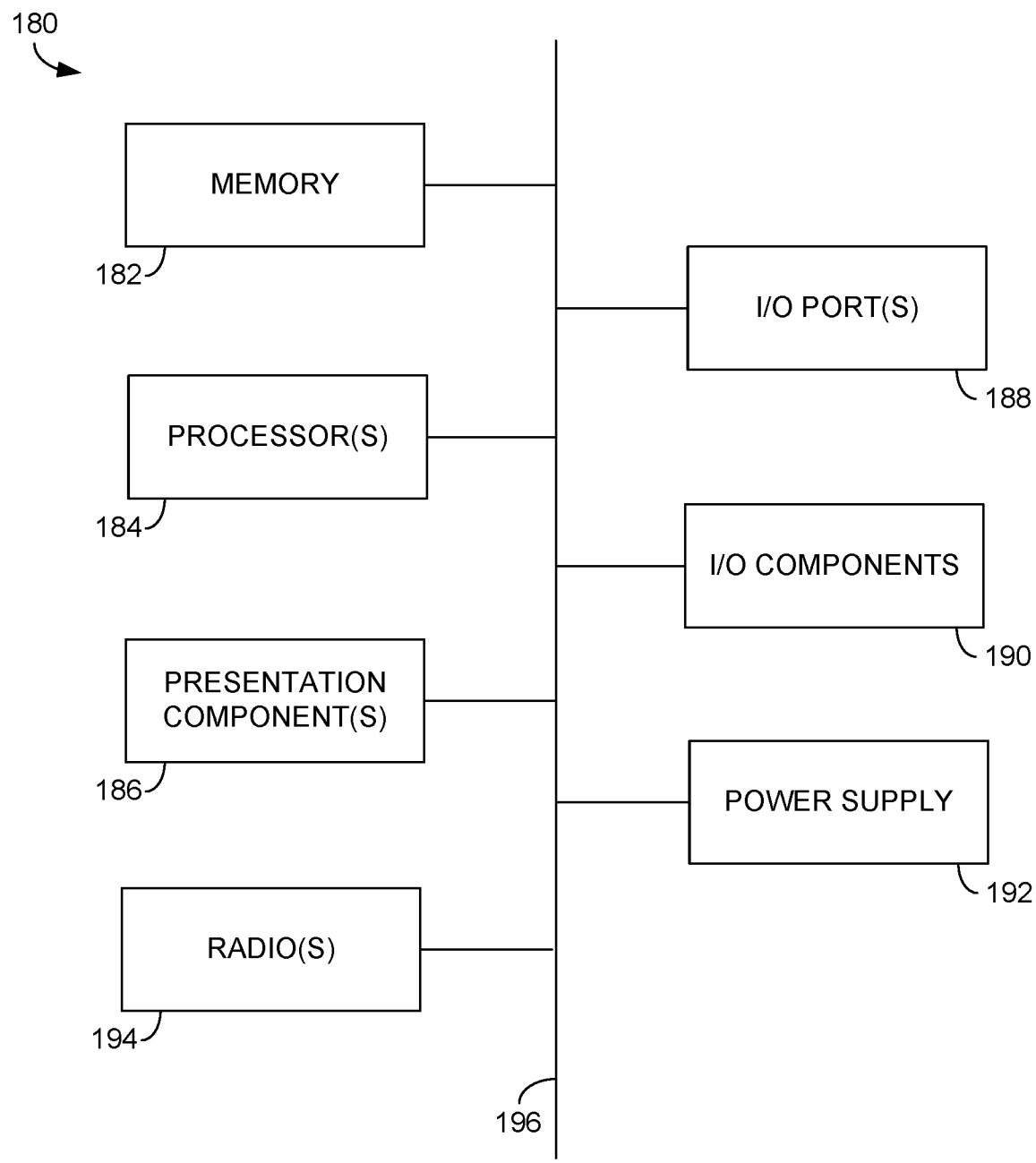

Turning briefly to FIG. 1B, there is shown one example embodiment of computing system 180 representative of a system architecture that is suitable for computer systems such as computer system 120. Computing device 180 includes a bus 196 that directly or indirectly couples the following devices: memory 182, one or more processors 184, one or more presentation components 186, input/output (I/O) ports 188, input/output components 190, radio 194, and an illustrative power supply 192. Bus 196 represents what may be one or more busses (such as an address bus, data bus, or combination thereof). Although the various blocks of FIG. 1B are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. As such, the diagram of FIG. 1B is merely illustrative of an exemplary computing system that can be used in connection with one or more embodiments of the present invention. Distinction is not made between such categories as "workstation," "server," "laptop," "hand-held device," etc., as all are contemplated within the scope of FIG. 1B and reference to "computing system."

Computing system 180 typically includes a variety of computer-readable media. Computer-readable media can be any available media that can be accessed by computing system 180 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 180. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 182 includes computer-storage media in the form of volatile and/or nonvolatile memory. The memory may be removable, non-removable, or a combination thereof. Exemplary hardware devices include solid-state memory, hard drives, optical-disc drives, etc. Computing system 180 includes one or more processors that read data from various entities such as memory 182 or I/O components 190. Presentation component(s) 186 present data indications to a user or other device. Exemplary presentation components include a display device, speaker, printing component, vibrating component, etc.

In some embodiments, computing system 194 comprises radio(s) 194 that facilitates communication with a wireless-telecommunications network. Illustrative wireless telecommunications technologies include CDMA, GPRS, TDMA, GSM, and the like. Radio 194 may additionally or alternatively facilitate other types of wireless communications including Wi-Fi, WiMAX, LTE, or other VoIP communications. As can be appreciated, in various embodiments, radio 194 can be configured to support multiple technologies and/or multiple radios can be utilized to support multiple technologies.

I/O ports 188 allow computing system 180 to be logically coupled to other devices, including I/O components 190, some of which may be built in. Illustrative components include a microphone, joystick, game pad, satellite dish, scanner, printer, wireless device, etc. The I/O components 190 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing system 180. The computing system 180 may be equipped with depth cameras, such as stereoscopic camera systems, infrared camera systems, RGB camera systems, touchscreen technology, and combinations of these, for gesture detection and recognition. Additionally, the computing system 180 may be equipped with accelerometers or gyroscopes that enable detection of motion.

The architecture depicted in FIG. 1B is provided as one example of any number of suitable computer architectures, such as computing architectures that support local, distributed, or cloud-based software platforms, and are suitable for supporting computer system 120.

Returning to FIG. 1A, in some embodiments, computer system 120 is a computing system made up of one or more computing devices. In some embodiments, computer system 120 includes one or more software agents and, in an embodiment, includes an adaptive multi-agent operating system, but it will be appreciated that computer system 120 may also take the form of an adaptive single agent system or a non-agent system. Computer system 120 may be a distributed computing system, a data processing system, a centralized computing system, a single computer such as a desktop or laptop computer or a networked computing system.

Figure 2:
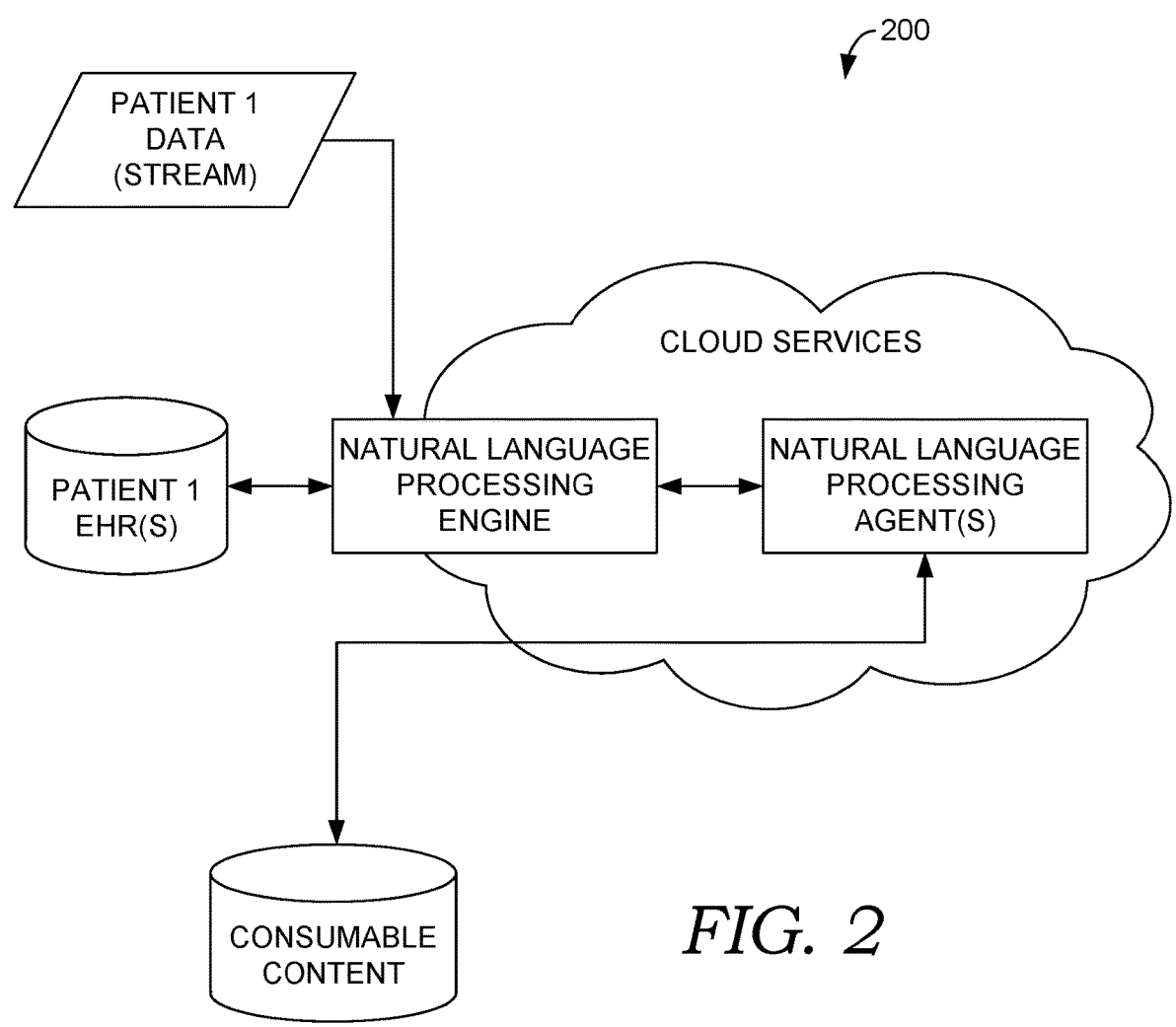
FIG. 2 represents a block diagram of an exemplary natural language processing system in accordance with embodiments of the present disclosure.

In some embodiments, computer system 120, storage 121, and software stack 125 are implemented in example system 200 in FIG. 2. System 200 processes and maps data into consumable content. In this example system, a natural language processing engine receives patient information (such as from one or more patient EHRs or a data stream), which may be provided by a patient sensor or provided each time a patient is assessed by a caregiver. Natural language processing engine may use one or more natural language processing agents to process the received patient information into consumable content, which may be used as discussed in connection to FIG. 3. In some embodiments, the consumable content is de-identified. In some embodiments, the patient information is encoded into one or more clinical concepts, which may be translated or "mapped" to a standard or universal nomenclature, thereby rendering the content consumable by the other decision support services, applications, features, and agents described herein. In some embodiments and contexts, the NLP engine may be referred to herein as medical language processing (MLP) engine. FIG. 2 depicts one example architecture that may be used for implementing the enhanced NLP system, but alternative arrangements may be used.

Figure 3:
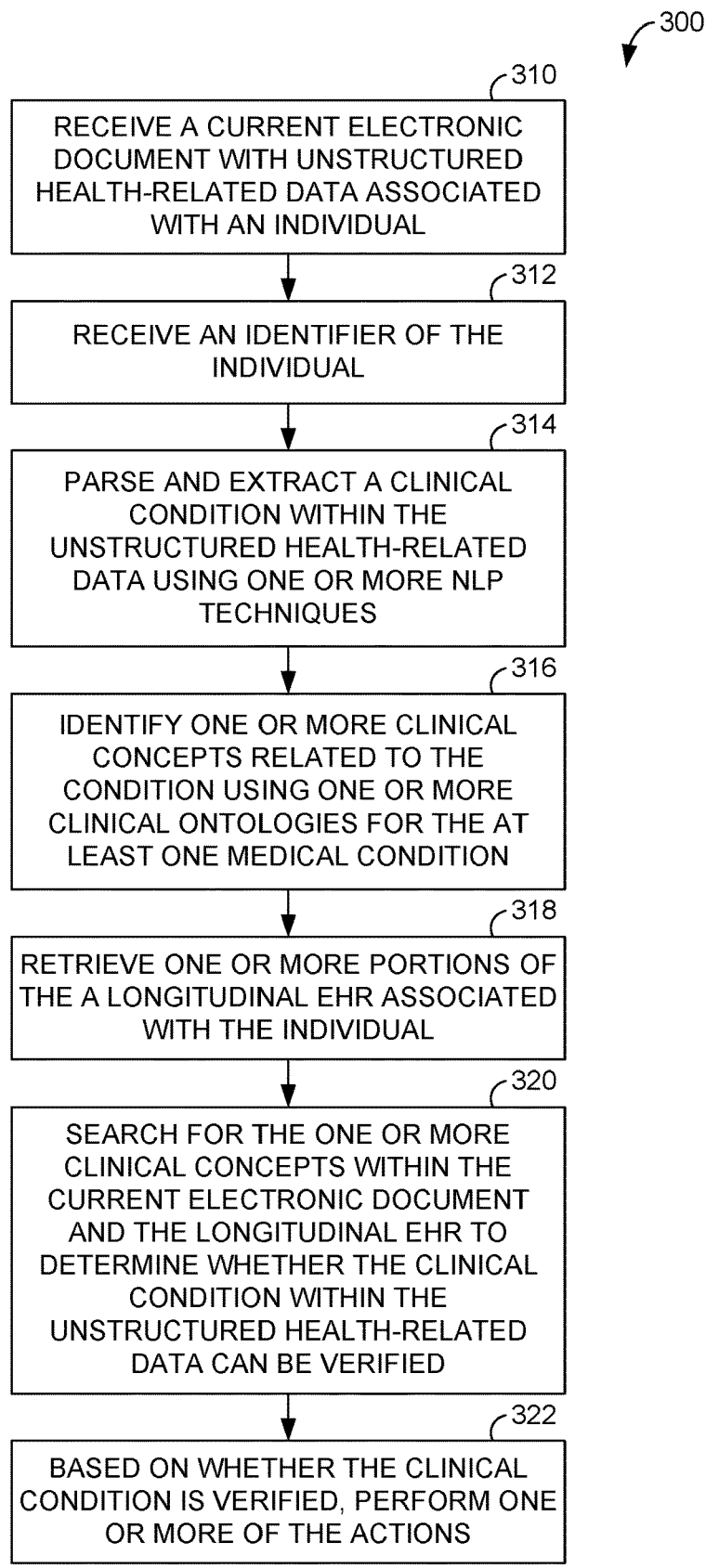
FIG. 3 depicts a flow diagram of a method for providing enhanced natural language processing of clinical documentation in accordance with an embodiment of the disclosure.

Turning now to FIG. 3, one example embodiment of a method for enhanced NLP is provided and is referred to generally as method 300. In particular, example method 300 utilizes a patient's longitudinal EHR and a clinical ontology to verify information, such as a clinical condition diagnosis, extracted though natural language processing. This method provides a higher confidence level in the confidence assigned to the extracted information, whether the confidence is positive, negative, or uncertain, compared to traditional NLP technologies. In some embodiments, method 300 is suitable for implementation as a computer-performed decision support tool or application for confirming a potential diagnosis found in a caregiver's note about a patient or for requesting additional supporting information.

In accordance with method 300, at step 310, an electronic document with unstructured health-related data associated with an individual is received. The individual may be referred to herein as a patient. The electronic document may be referred to herein as a current electronic document because the health-related data within the document may be data relating to a most current or recent patient encounter. The unstructured data may be in the form of text, clinical documents, recordings, sensor data, or other formats. For instance, the unstructured data may be text or a recording forming a narrative, comments, or note about a patient's current or most recent interaction with a care provider. Accordingly, the electronic document may be referred to herein as a "clinician note".

At step 312, an identifier of the individual associated with the unstructured health-related data is received. The identifier may be a patient identifier in a format utilized by a particular facility or clinical care system. The patient identifier may not include any sensitive identifying information and may be associated with the particular individual's electronic health record.

At step 314, the unstructured health-related data in the current document is parsed and one or more discrete elements, such as a clinical condition, is extracted from the parsed current document using one or more NLP techniques. In an embodiment, an NLP service, which may be embodied as a decoder program, software routine(s) or health care agent, is used in step 314 to extract one or more discrete elements from the received unstructured health-related data. In an embodiment, the NLP service uses an open-source natural language processing system such as the Apache cTAKES (clinical Text Analysis and Knowlfedge Extraction System). In an embodiment, the NLP service is modeled on the open-source UIMA (unstructured information management architecture) platform from IBM, the Open NLP natural language processing toolkit, or core NLP pipeline of the Open Health Natural Language Process (OHNLP) Consortium. In an embodiment, an NLP service is embodied as a natural language processing agent, such as illustrated in FIG. 2. Additionally, in some embodiments, NLP is used herein to refer to medical language processing (MLP). The extracted discrete elements may comprise clinical features such as one or more clinical conditions. The clinical condition, also referred to herein as a medical condition, may be a disease, diagnosis, clinical issue, or clinical event for the particular individual. The clinical event may be an epoch or series of epochs. Additional clinical features, such as medications, allergies, examinations, procedures, laboratory information, and the like, may also be extracted using the NLP service. This extracted information may be stored in association with the current electronic document.

In some embodiments, NLP is automatically performed when the unstructured data is being entered into the electronic document or is automatically performed after the electronic document is saved. For example, NLP may be automatically initiated as a user, such as a clinician, is entering a textual narrative or a textual narrative is crated from a clinician's audio recording. In other embodiments, an indication to start natural language processing is received from a user selection. Such an indication may be received when the information is being input into a document or at a later time.

In some embodiments, the objective of using the natural language processing techniques is to find a diagnosis of a clinical condition by identifying a clinical condition within the unstructured data. The clinical condition extracted from the unstructured data may be ambiguous in that the status of the diagnosis may not be immediately clear to the system running the natural language processing techniques without further corroboration. For instance, based on the expression within which the clinical condition is extracted, it may be unclear whether the individual was diagnosed with the clinical condition, is at risk for the clinical condition, asked the clinician about the condition, or experienced a change in the clinical condition. In this way, the expression of the clinical condition may be considered ambiguous. As such, in some embodiments, method 300 further comprises determining the clinical condition is ambiguously expressed within the health-related data, and, if so, the process of verifying the clinical condition continues. In alternative aspects, an extracted expression of the clinical condition is verified regardless of whether or not it is ambiguously expressed.

Continuing, at step 316, one or more clinical concepts related to the clinical condition are identified using one or more clinical ontologies for the at least one clinical condition. Accordingly, in some embodiments, method 300 further comprises receiving or retrieving the one or more clinical ontologies (also referred to herein as medical ontologies) from which the related clinical concepts are identified. As used herein, a clinical ontology provides contextual relationships between a particular clinical condition and clinical concepts, such as evidence or symptoms of a clinical condition, treatment for the clinical condition (including procedures and medications), commonly co-existing conditions, risk factors for the clinical condition, and/or disqualifying evidence. The term "clinical ontology" as used herein is not intended to merely define a semantic hierarchy between concepts. Rather, a clinical ontology may provide one or more itemsets comprising a set of codified clinical concepts (including the clinical condition) that occur together within a patient's EHR as determined through one or more machine learning processes. The itemsets may be the mere presence of clinical concepts that appear in association with a condition. For example, when a patient is diagnosed with acute blood loss anemia (ABLA), the patient's record may reflect the presence of an iron level test. In other aspects, the itemset comprises specific values or a range of values found to be relevant to the clinical condition. In some embodiments, the itemsets comprise more than one value or a pattern of values for a clinical concept, such as a time series, a change in values, or a rate of change of values.

In exemplary embodiments, the itemsets are not frequent itemsets formed based having a high frequency of appearing together in a patient's EHR but, instead, are formed upon being found to have a high relevancy to the clinical condition based on context. Accordingly, the itemsets within the ontologies (also referred to herein as "high-value itemsets") may comprise clinical concepts that occur with the clinical condition between 0.05% and 1.0% of the time in the EHRs of a reference population but are concepts that are found to have a greater weight in predicting the presence of or the severity of a particular clinical condition or outcome, particularly in light of the presence of other clinical concepts found in the patient's chart. These less frequent but contextually relevant itemsets may be identified for use in the ontologies using a minimum support threshold (minsup) that is calculated using a support difference, which is the minimum deviation of an item from its support within a reference data set. Generating ontologies with high-value items is described in further detail in U.S. Nonprovisional application Ser. No. 15/386,876, the entirety of which is incorporated by reference. In some aspects, the ontologies may comprise frequent itemsets in addition to or alternatively to the high-value itemsets.

The ontology for a particular clinical condition provides information regarding clinical concepts that should or should not be in the patient's current documentation or longitudinal EHR to confirm a diagnosis of the clinical condition. For example, in exemplary aspects, the ontology provides high-value itemsets for the clinical condition. The high-value itemset may be the presence of certain clinical concepts, such as a particular medication or procedure. The high-value itemsets may include specific values, such as dosages or measurements, for certain clinical concepts.

This information within the ontology can include qualifying information and disqualifying information. Qualifying information is data that, when present, indicates a greater likelihood of the diagnosis as being confirmed, and disqualifying information is data that, when present, indicates a lower likelihood of the diagnosis being confirmed.

In some embodiments, multiple clinical conditions may be extracted from the current electronic document. A separate ontology may be used for each condition to identify concepts related to one particular condition. Accordingly, when multiple conditions are extracted from a current document using NLP, multiple ontologies may be retrieved to identify concepts relevant to each condition.

At step 318, one or more portions of a longitudinal electronic health record (EHR) associated with the individual is retrieved. The longitudinal EHR may provide context to the current document through data from one or more previous encounters, also referred to as episodes of care. Accordingly, as used herein, the term "longitudinal EHR" refers to an electronic health record for an individual with documentation spanning across multiple encounters for the individual or at least one encounter prior to the current one for which the current electronic document is created. Accordingly, the documentation within the longitudinal EHR may be recorded at different times. The longitudinal EHR may also comprise at least some structured data. In exemplary aspects, documentation from previous encounters is time and date stamped such that, in addition to providing the substance of those previous encounters, the longitudinal EHR provides a time line of the patient's care and, in some instances, one or more time series of physiological variables and clinical concepts related to the patient. In this way, retrieving and using the longitudinal record can provide for a time-oriented natural language processing that is not available with conventional methods focusing only on the current document. The time series adds additional context to provide increased confidence levels in the semantic processing of the individual's current documentation.

The longitudinal EHR may be used to confirm or validate the diagnosis of the clinical condition found in the current electronic documentation. As such, at step 320, the method 300 comprises searching for indicators of the one or more clinical concepts related to the clinical condition (as determined using the ontology) within the current electronic document and the longitudinal EHR to determine whether the clinical condition within the unstructured health-related data can be verified. In exemplary aspects, searching for indicators of the one or more clinical concepts comprises searching for structured data for the clinical concepts, such as measurements for physiological values or presence of a specific medication, laboratory, or procedure In some embodiments, the current documentation is searched first and, potentially, if the related clinical concepts are not present in the current documentation, the individual's longitudinal EHR is searched. In other embodiments, both the current documentation and longitudinal EHR are automatically searched. Because sometimes the progression of or change in physiological variables through a time series may be useful in confirming the clinical condition, structure data regarding to the related clinical concepts found in the current processed document (for a current encounter) and the longitudinal EHR (for previous encounters) may be used together to verify the clinical condition. In some embodiments, values for the clinical concepts may be identified using different nomenclature by converting the given nomenclature to a standard nomenclature if it is not already in a standard format.

In one aspects, verification may include assigning a confidence value based on a statistical likelihood of whether the clinical condition matches the clinical concept. For example, when matching, a relationship between the clinical concept and the clinical condition is measured for the current documentation and/or the individual's longitudinal EHR. Various methods for determining a confidence value may be utilized. In some embodiments, confidence values are represented as p-values where p-value is at or below 0.05 shows a high confidence in the relationship between two sets of data. Thus for example, in an embodiment, the determined p-value may be evaluated against a confidence threshold. This threshold may comprise a single value or a range or set of values, and the confidence value may be positive (i.e., having a p-value under the confidence threshold). The confidence value may be negative, in other words a p-value higher than the confidence threshold. The confidence value may be neutral, in other words, a p-value at the confidence threshold.

Based on the p-value found, it may be higher, lower or at a threshold value. The term "threshold value" may comprise a single value or a range or set of values. The confidence value may be positive, in other words a p-value under the threshold value. The confidence value may be negative, in other words a p-value higher than the threshold value. The confidence value may be neutral, in other words, a p-value at the threshold value.

The entire longitudinal EHR is retrieved and searched to find values of the identified clinical concepts. In other aspects, only portions of the longitudinal record that are likely to have structured data relating to the clinical concepts (such as laboratory or medication data) are searched. Further, searching may be limited to a set time window, such as the previous one year, previous three years, previous 10 encounters, and the like. In some embodiments, portions of the longitudinal EHR are not retrieved until relevant information from ontologies are identified and only portions relevant to the concepts in the ontologies are retrieved.

Figure 4B:
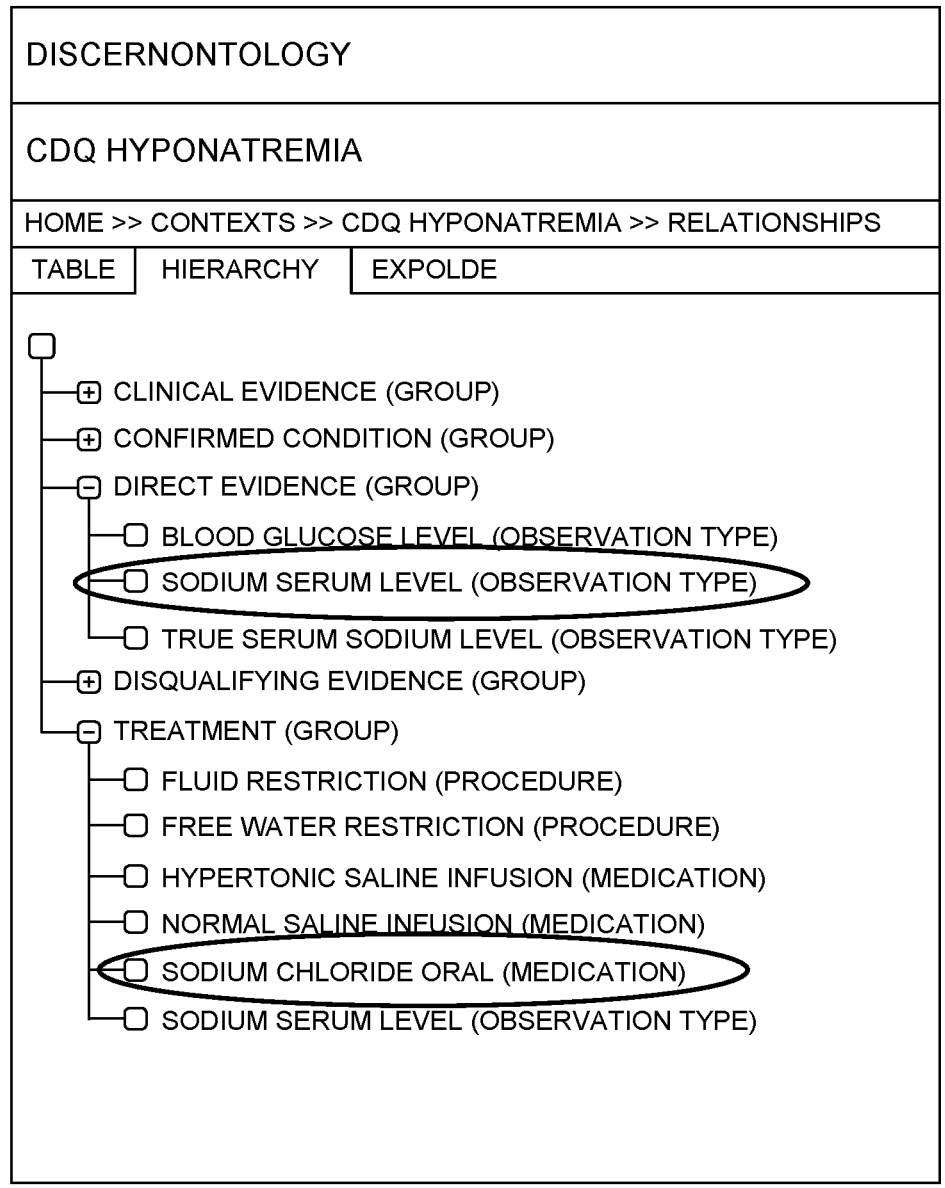

Accordingly, embodiments of the disclosed process utilize a clinical ontology may determine what information to look for in either the processed current document or in the longitudinal record for verifying the clinical condition extracted form unstructured data in the current document through natural language processing. Turning to FIGS. 4A-4D, portions of current documentation, longitudinal EHR, and an ontology that may be utilized in an example scenario are provided. FIG. 4A, for instance, depicts an example current electronic document as it would be depicted on a graphic user interface. In an "Impression/Plan" section of the document, comments in the form of unstructured data states: "Question if hyponatremia is worsening and if so will continue current medications." Using natural language processing techniques described with respect to step 314 of FIG. 3, the clinical condition hyponatremia, which refers to low sodium level in an individual's blood, may be identified as a high confidence. But the comment may be determined to be ambiguous as to whether the individual's hyponatremia is worsening or if the individual even has hyponatremia. Accordingly, verification of the initial NLP identification of the hyponatremia as a diagnosis may be performed.

Based upon the search, the one or more clinical conditions may be verified. Verifying the clinical condition may include the current document based on the presence or lack thereof of the supporting documentation in the patient's record. For example, in some aspects, the more supporting documentation matching concepts identified in the ontology that are found in the patient's record, the assigned statistical confidence will be higher. The presence of disqualifying information in the patient's record will lower the assigned confidence value.

FIG. 4B depicts part of an ontology for the clinical condition hyponatremia. This ontology may be retrieved upon extracting the clinical condition hyponatremia from processed document. As illustrated in FIG. 4B, three evidence-type clinical concepts (also referred to as observations) are identified as being relevant to hyponatremia, including sodium serum level, and six types of treatment clinical concepts are identified, including sodium chloride oral medication.

Figure 4C:
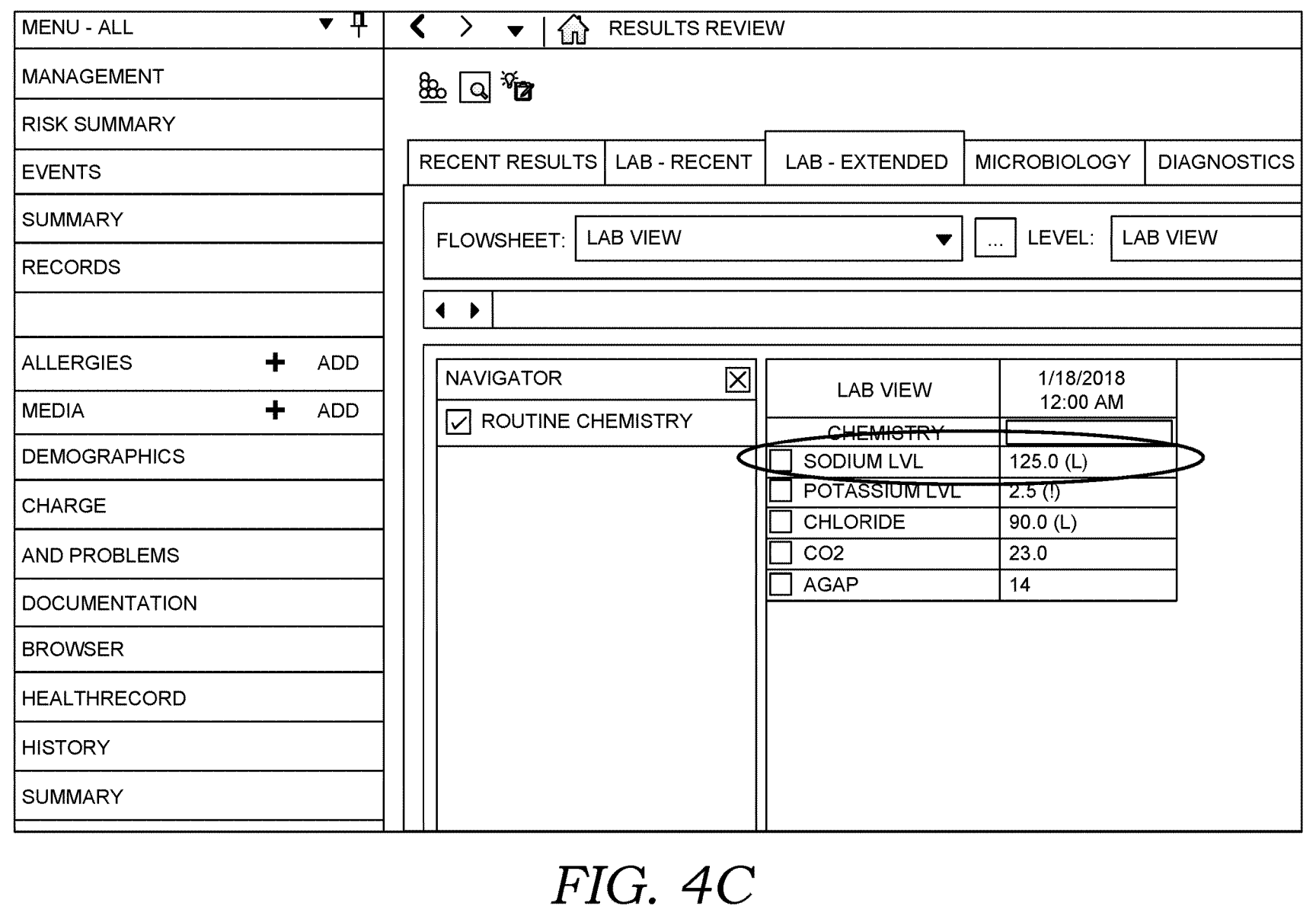
Figure 4D:
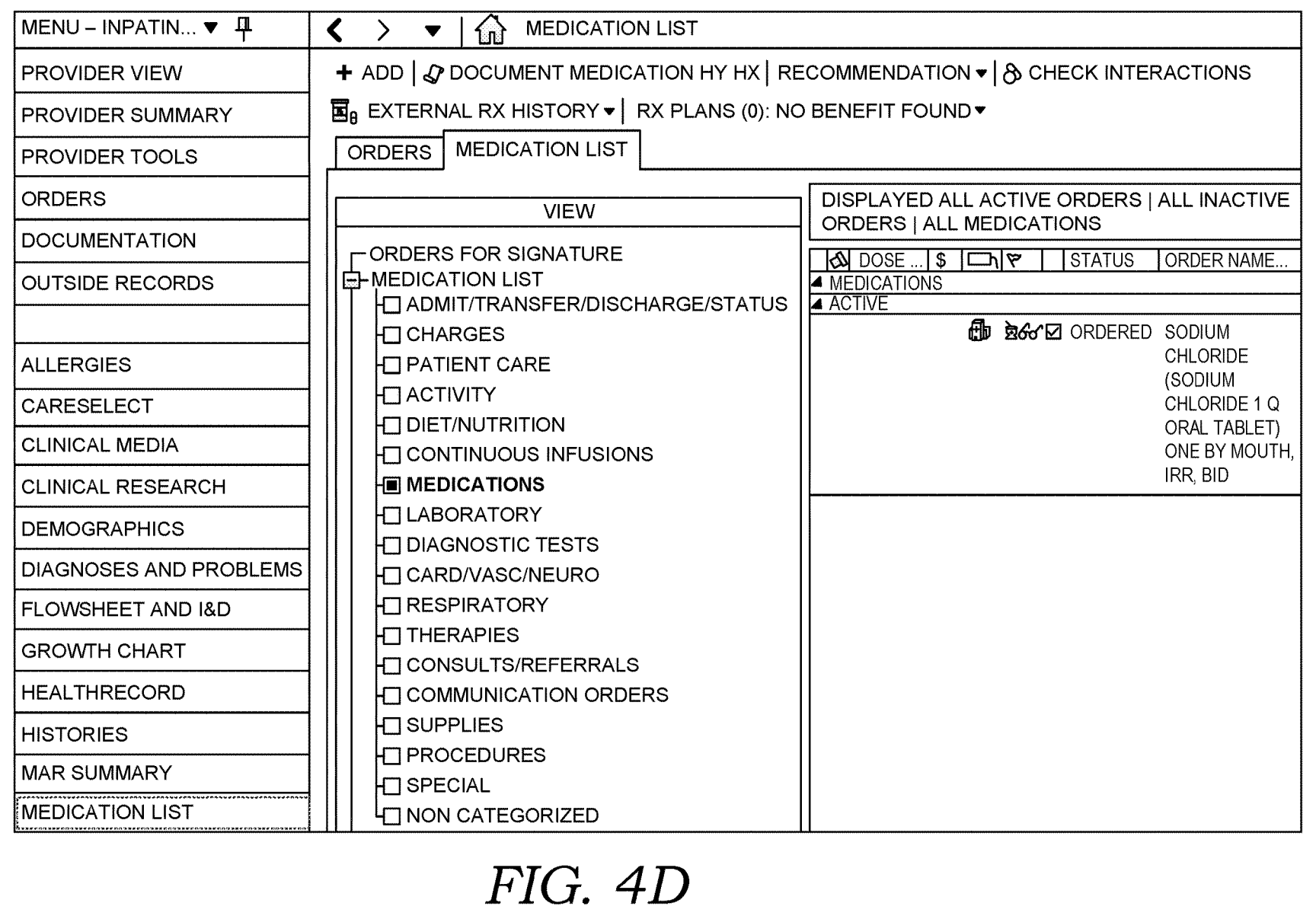

Values indicating the presence or level of the related clinical concepts may be searched for in the current document or in the patient's longitudinal EHR. As illustrated in FIG. 4A, the related clinical concepts identified in the ontology in FIG. 4B cannot be found in the current document 400. Accordingly, the concepts may be found in the individual's longitudinal EHR. FIG. 4C, for example, illustrates an extended laboratory view of the individual longitudinal EHR, which contains lab results from previous visits. The longitudinal record indicates that a sodium level test was previously performed, which is consistent with suspected hyponatremia. Further, the record indicates the measure of the sodium level was 125.0 mmol/L, which is consistent with a hyponatremia diagnosis. Additionally, FIG. 4D depicts a medication list within an individual's longitudinal record, which shows an active medication prescription for sodium chloride, also consistent with hyponatremia as shown by the ontology in FIG. 4B. Accordingly, based on the individual's longitudinal EHR, the NLP performed for the current document may be confirmed with a higher confidence level.

Turning back to FIG. 3, at step 322, based on whether the clinical condition is verified, one or more actions may be performed. In some embodiments, the action comprises providing a notification, in real time, to a user of an application used to create or edit the current electronic document. The notification may indicate whether the clinical condition has been verified. In some aspects, a notification is triggered only if the clinical condition cannot be verified using the current documentation and longitudinal EHR. In exemplary embodiments, the notification may comprise a request for supplemental information to support a diagnosis for the clinical condition. For instance, when none or insufficient corroborating evidence of the clinical condition is found in the longitudinal EHR, a prompt may be created and displayed on a graphic user interface for the user to append the unstructured data with information regarding the related clinical concepts. For instance, when a diagnosis of a clinical condition within a narrative of a patient brought into the emergency department cannot be corroborated, a note from an emergency medical technician regarding medication administered at the scene or a medical or family history provided orally by the patient may be uploaded to support the diagnosis.

Another action that may be taken is the creation or modification of a metadata tag linked to the processed current document. The metadata tag may indicate a confidence value of the NLP-identified information, such as the clinical condition. For instance, in one embodiment, a tag is created for a discrete element, such as the clinical condition, indicating an uncertainty in the natural language processing when there is ambiguity in the expression of the word or phrase. In an embodiment, the ambiguity corresponds with the neutral confidence value. This metadata tag may be modified to reflect whether the predicted word or phrase is confirmed or not or with what confidence the word or phrase is provided based on the confirmation using the ontology and longitudinal record. For example, the metadata tag may indicate the confirmation with a "yes", "no", "not sure", "confirmed", unconfirmed", "positive", "negative", "uncertain," and the like. Terms like "positive", "negative," and "uncertain" may be commensurate with confidence values that are positive, negative, or neutral respectively. These indicators of a confirmation for the NLP identified information can be provided with a higher confidence due to the use of the ontology and longitudinal record, even when the clinical condition cannot be confirmed. In some aspects, the tag may include a reason statement providing a reason for the confirmation indicator. For example, the indicator may be "negative" indicating the NLP identified hyponatremia condition is not likely a correct diagnosis and the reason statement could state that there are no sodium levels measured for the patient in the current document or the patient's longitudinal record. The metadata tag, with the confirmation and/or the reason statement, may be provided to the application programming interface. Additionally, the current document may be marked up through visual indications displayed on a graphic user interface when viewing the current document.

Further, in exemplary aspects, a specialized relational database may be electronically modified based on whether the clinical condition can be verified. The specialized relational database may associate identified issues with a particular patient's record or with specific data within the record. Modifying the relational database may comprise adding an entry for the clinical condition indicating whether the clinical condition could be confirmed and/or a likelihood that a diagnosis of the clinical condition. For example, if the processed document includes an ambiguous statement about a patient having hyponatremia and the patient's longitudinal record has no measurements of sodium levels, an entry may be created to an existing table or a new table may be created with an entry for hyponatremia linked to an indication of a low probability that the patient's diagnosis is hyponatremia. In some aspects, an entry is created regardless of whether the diagnosis is confirmed, and in alternative aspects, an entry in the specialized relational database is created only when the diagnosis cannot be confirmed. In some embodiments, this relational database is referred to herein as a problem list table, which may include additional entries for problems arising from ambiguous NLP-identified information. The problem list table may further include entries for other patients and/or for other types of problems not directly related to confirming NLP-identified information. The entry for the diagnosis may be created with a "proposed" or "suspended status" and be flagged for manual review by user meeting predefined credentials. In some aspects, an entry is created even when the diagnosis is confirmed such that it can be reviewed by a user. The diagnosis may already be an entry in the problem list table, but a severity or other modifier for the clinical condition may be added or changed for review by a user at a later time.

Another action that may be initiated is a document quality review. For example, there may be coding document quality (CDQ) processes for determining whether the documentation supporting a coding level for a patient is sufficient, and determining whether a diagnosis can be confirmed may initiate a call to the program for CDQ processes. A coding level may indicate a high confidence value to the presence of a clinical code, and the CDQ process may search for a clinical code or clinical codes corresponding to the clinical condition. The CDQ process may utilize the search for confirmation of the NLP-identified information to determine whether there is sufficient documentation to support a code or may perform an independent review of the documentation to make this determination. Sufficient documentation to support the coding level may occur where an independent certainty value with a p-value under 0.05 is measured when comparing the current document and/or the longitudinal EHR with the clinical condition. When the documentation is insufficient or inconsistent with the current coding level, a notification may be provided.

In some embodiments, one or more actions may be provided together. For instance, in some embodiments, a metadata tag is always added to the processed document indicating whether the clinical condition was confirmed, and when a user is still inputting information in the current electronic document or when the application with the electronic document is still open, a notification may also be provided to the user in real time. In some embodiments, when sufficient corroborating information is not found in the longitudinal EHR, a notification may be sent to a message queue for a clinician-user to review at a later time.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. Non-transitory computer-readable media having computer-executable instructions embodied thereon that when executed, provide enhanced natural language processing, the method comprising:
    receiving a current electronic document with unstructured health-related data associated with an individual;
    receiving an identifier of the individual associated with the unstructured health-related data;
    parsing and extracting at least one clinical condition within the unstructured health-related data using one or more natural language processing techniques, the parsing and extracting further comprising:
    generating a tag for a clinical condition where it is determined there is an ambiguity in the unstructured health-related data; and
    providing a notification including an indication of the tag, in real time, to the user of the application for entering the current electronic document;
    identifying one or more clinical concepts related to the clinical condition using one or more clinical ontologies for the at least one clinical condition, each clinical ontology providing contextual relationships between the clinical condition and the one or more clinical concepts;
    searching for indicators of the one or more clinical concepts related to the clinical condition within the current electronic document to determine whether the clinical condition within the unstructured health-related data can be verified; and
    based on whether the clinical condition is verified, performing one or more of the following actions:
    providing a notification, in real time, to a user of an application for entering the current electronic document, the notification either stating the clinical condition has been verified, the clinical condition cannot be verified, or requesting supplemental information to support a diagnosis for the clinical condition;
    determining that the current documentation is sufficient to support a diagnosis and providing the notification indicating so;
    determining that documentation is insufficient and providing the notification to the user that additional documentation is needed; or
    electronically modifying a relational database by adding an entry for the clinical condition, the entry indicating a likelihood of a diagnosis of the clinical condition being confirmed.

2. The computer readable media of claim 1, wherein searching for indicators comprises searching for one or more clinical concepts such as physiological values or specific medication, lab, or procedure and further wherein verification comprises assigning a confidence value based on a statistical likelihood of whether the clinical condition matches the clinical concept.

3. The computer readable media of claim 2, wherein the confidence value comprises one of a positive, neutral, or negative state indicating a statistical likelihood the clinical condition matches the clinical concept is above, within, or below a threshold value.

4. The computer readable media of claim 3, wherein determining the current documentation is insufficient to provide the notification occurs when the confidence value is negative or neutral.

5. The computer readable media of claim 3, wherein the notification indicating the current documentation is sufficient to support the diagnosis is provided when the confidence value is positive.

6. The computer readable media of claim 1, having instructions further comprising:
    retrieving one or more portions of a longitudinal electronic health record (EHR) associated with the individual, the longitudinal EHR comprising documentation of at least one prior encounter and having at least a portion of a structured data; and
    wherein searching for indicators of the one or more clinical concepts is further related to the longitudinal EHR.

7. The computer readable media of claim 1, wherein determining the current documentation is sufficient to support a diagnosis includes measuring a presence or level of the related clinical concepts in the current documentation.

8. The computer readable media of claim 7, wherein the likelihood that the diagnosis of the clinical condition is based on a confidence value and the presence or level of the related clinical concepts in the current documentation.

9. The computer readable media of claim 1, wherein based on whether the clinical condition is verified, additionally performing:
    triggering a coding document quality process to check whether the current documentation supports a given coding level assigned to the clinical condition, wherein determining whether the documentation supports a given coding level comprises determining a high confidence value to the presence of a clinical code corresponding to the clinical condition; and
    providing a notification when the current documentation supports a coding level.

10. A computer-implemented method of providing enhanced natural language processing, the method implemented by one or more processors, comprising:
    receiving a current electronic document with unstructured health-related data associated with an individual;
    receiving an identifier of the individual associated with the unstructured health-related data;
    parsing and extracting at least one clinical condition within the unstructured health-related data using one or more natural language processing techniques;
    identifying one or more clinical concepts related to the clinical condition using one or more clinical ontologies for the at least one clinical condition, each clinical ontology providing contextual relationships between the clinical condition and the one or more clinical concepts;
    retrieving one or more portions of a longitudinal electronic health record (EHR) associated with the individual, the longitudinal EHR comprising documentation of at least one prior encounter and at least a portion of a structured data; and searching for indicators of the one or more clinical concepts related to the clinical condition within the current electronic document and the longitudinal EHR to determine whether the clinical condition within the unstructured health-related data can be verified, wherein searching for indicators comprises searching for one or more clinical concepts such as physiological values or specific medication, lab, or procedure and further wherein verification comprises assigning a confidence value based on a statistical likelihood of whether the clinical condition matches the clinical concept; and based on whether the clinical condition is verified, performing one or more of the following actions:

providing a notification, in real time, to a user of an application for entering the current electronic document, the notification either stating the clinical condition has been verified, the clinical condition cannot be verified, or requesting supplemental information to support a diagnosis for the clinical condition;

determining that the current documentation is sufficient to support a diagnosis and providing the notification indicating so;

determining that documentation is insufficient and providing the notification to the user that additional documentation is needed; or electronically modifying a relational database by adding an entry for the clinical condition, the entry indicating a likelihood of a diagnosis of the clinical condition being confirmed;

triggering a coding document quality process to check whether the current documentation supports a given coding level assigned to the clinical condition, wherein determining whether the documentation supports a given coding level comprises determining a high confidence value to the presence of a clinical code corresponding to the clinical condition; and providing a notification when the current documentation supports a coding level.

11. The computer implemented method of claim 10, wherein the confidence value comprises one of a positive, neutral, or negative state a statistical likelihood the clinical condition matches the clinical concept is above, within, or below a threshold value;

wherein determining the current documentation is insufficient to provide the notification occurs when the confidence value is negative or neutral; and wherein the notification is provided when the confidence value is positive.

12. The computer implemented method of claim 10, wherein based on whether the clinical condition is verified, additionally performing:

triggering a coding document quality process to check whether the current documentation and the longitudinal EHR support a given coding level assigned to the clinical condition, wherein determining whether the documentation supports a given coding level comprises determining a high confidence value to the presence of a clinical code corresponding to the clinical condition; and providing a notification when the current documentation supports a coding level.

13. The computer implemented method of claim 10, wherein the parsing and extracting at least one clinical condition further comprises:

generating a tag for a clinical condition where it is determined there is an ambiguity in the unstructured health-related data and the longitudinal EHR; and providing a notification including an indication of the tag, in real time, to the user of the application for entering the current electronic document.

14. Non-transitory computer-readable media having computer-executable instructions embodied thereon that when executed, provide enhanced natural language processing, the method comprising:

receiving a current electronic document with unstructured health-related data associated with an individual;

receiving an identifier of the individual associated with the unstructured health-related data;

parsing and extracting at least one clinical condition within the unstructured health-related data using one or more natural language processing techniques;

identifying one or more clinical concepts related to the clinical condition using one or more clinical ontologies for the at least one clinical condition, each clinical ontology providing contextual relationships between the clinical condition and the one or more clinical concepts;

retrieving one or more portions of a longitudinal electronic health record (EHR) associated with the individual, the longitudinal EHR comprising documentation of at least one prior encounter and having some a structured data; and searching for one or more clinical concepts such as physiological values or specific medication, lab, or procedure related to the clinical condition within the current electronic document and the longitudinal EHR and assigning a confidence value based on a statistical likelihood of whether the clinical condition matches the clinical concept, the confidence value comprising one of a positive, neutral, or negative state indicating a statistical likelihood the clinical condition matches the clinical concept is above, within, or below a threshold value, and based on whether the clinical condition has a sufficient confidence value, performing an action, wherein the action comprises:

providing a notification, in real time, to a user of an application for entering the current electronic document, the notification either stating the clinical condition has a sufficient confidence value, the clinical condition has an insufficient confidence value, or requesting supplemental information to support a diagnosis for the clinical condition; and determining that documentation is insufficient and providing the notification to the user that additional documentation is needed wherein determining the current documentation is sufficient to support a diagnosis includes measuring a presence or level of the related clinical concepts in the current documentation.

\* \* \* \* \*